Feb. 13, 1968  J. S. ADAMS  3,368,854
BEARING RETAINER AND METHOD OF MAKING AND ASSEMBLING SAME
Filed Dec. 30, 1965
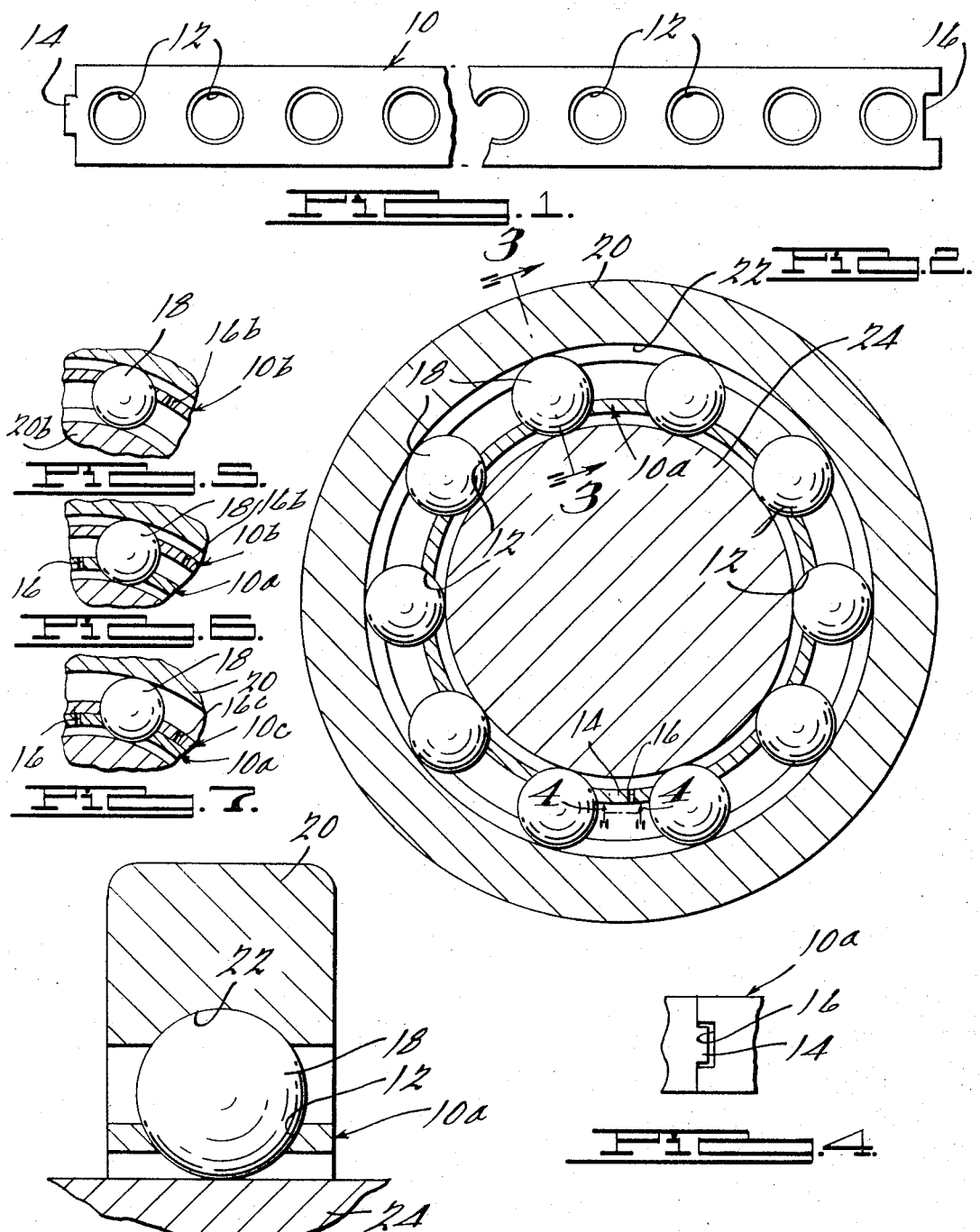
INVENTOR.
John S. Adams United States Patent Office 3,368,854
Patented Feb. 13, 1968

3,368,854
BEARING RETAINER AND METHOD OF MAKING AND ASSEMBLING SAME
John S. Adams, Lancaster, Pa., assignor to Federal-Mogul Corporation, Detroit, Mich., a corporation of Michigan
Filed Dec. 30, 1965, Ser. No. 517,767
20 Claims. (Cl. 308—201)

ABSTRACT OF THE DISCLOSURE

A ball bearing retainer made from a flat strip of material which is formed into a circular shape.

The present invention relates to an antifriction bearing rolling element retainer construction, the method for making same and the method of assembling an antifriction bearing.

Generally, antifriction bearing rolling element retainers (hereafter referred to as bearing retainers or retainers) are made from a wide strip of material from which are punched numerous circular blanks and upon which various forming and finishing operations are required in order to provide a circular retainer. In the retainer of the present invention, a substantial savings in material can be realized as well as a reduction in the number and/or complexity of forming operations required. Therefore, it is an object of the present invention to provide a novel bearing retainer which can be made from less material and which requires a simpler forming method.

In addition, the bearing retainer of the present invention is of a construction whereby assembly of the antifriction elements with the bearing race is facilitated.

Therefore, it is another object of the present invention to provide a retainer in which the time of assembly of retainer, antifriction members and race member is substantially reduced.

Another object of the present invention is to provide a novel method of making a bearing retainer; still another object of the present invention is to provide a novel method of making a bearing retainer and assembling a bearing assembly.

It is another object of the present invention to provide an improved bearing retainer.

Other objects, features, and advantages of the present invention will become apparent from the subsequent description and the appended claims, taken in conjunction with the accompanying drawings, in which:

FIGURE 1 is a top elevational view of a preformed strip after an initial forming operation from a thin flat strip of material;

FIGURE 2 is a side elevational view with some parts shown in section of a ball bearing assembly including an outer race member with the preformed strip of FIGURE 1 having been formed into its final shape and assembled and located in assembly relationship with the other components of the bearing assembly;

FIGURE 3 is a sectional view taken substantially along the line 3—3 of FIGURE 2;

FIGURE 4 is a view taken substantially along the line 4—4 in FIGURE 2;

FIGURE 5 is a fragmentary view of a modified form of the invention with the retainer of the present invention adapted for use with an inner race member;

FIGURE 6 is a fragmentary view of a modified form of the invention in which a pair of retainers are used with a plurality of balls to provide an assembly which can be handled without a race member; and FIGURE 7 is a modified form of the invention in which two retainers are located coextensively to increase axial stability.

Looking now to FIGURE 1, a preformed strip generally indicated by the numeral 10 is formed from a thin flat strip of steel to have a plurality of generally equally spaced circular apertures 12 and to have a tongue 14 at one end and a matching groove 16 at the opposite end. The flat preformed strip 10 is then formed into the ring 10a to have a circular shape generally with the tongue 14 located within the groove 16. At this time the formed ring is heat treated to increase its resilience (see FIGURES 2–4).

Looking specifically to FIGURE 2, the ring 10a has the tongue 14 located within the groove 16 with the circular openings 12 defining seats for a plurality of balls 18; an outer race member 20 has a raceway 22 in which are located the balls 18. The entire bearing assembly then can be located upon a circular shaft 24.

In assembling the retainer 10a and balls 18 with the outer race member 20, the retainer 10a is first reduced in diameter by overlapping the ends. The balls 18 can then be located in place and the ends of the retainer 10a released. Because of the resilience of the material of the retainer 10a, it will resume its original circular shape with the balls 18 then located in the seats or pockets 12 and with the tongue 14 located within the groove 16. The engagement of tongue 14 in groove 16 prevents the ends of the retainer 10a from axially separating from each other as a result of axial thrust forces accidentally applied to the retainer after the bearing assembly is completed. With the retainer 10a, balls 18 and outer race 20 thus assembled, the entire assembly can then be located upon the shaft 24. Note then that with the construction of the retainer 10a, assembly of the balls 18 and retainer 10a to a race member 20 is facilitated.

Note also that the method of fabrication of the retainer 10a is simple and direct and comparatively inexpensive, since the preformed strip member 10 can be formed merely from a thin flat strip of material with a minimum number of forming operations and then rolled and heat treated to form the final retainer member 10a. The resilience of the retainer 10a enables use of the method of assembly as described since the free ends can be overlapped to reduce the diameter of the retainer 10a whereby the balls 18 can be assembled therein after which the retainer 10a will assume its original shape.

Note also that the resilience of the retainer 10a can be utilized to securely hold the balls 18 against the raceway 22 of the race 20.

In the embodiment shown in the drawing, the pockets 12 are formed with a generally spherical contour defining a portion of a sphere having a diameter equal to or slightly larger than the diameter of the balls 18. Other contours could be utilized.

In the embodiment shown in FIGURE 5, a retainer 10b (similar to retainer 10a) is provided for use with an inner race member 20b. The retainer 10b is of a larger diameter than that of retainer 10a whereby it can be located at the radially outer side of the ball bearings 18 to resiliently maintain them radially inwardly. Again, because of its resilience, the retainer 10b can be enlarged by moving its ends apart at the groove 16b whereby assembly of the ball bearings 18 is facilitated. In the embodiment of FIGURE 6, two retainers such as retainers 10a and 10b are utilized whereby the balls 18 can be held in place independently of an inner or outer race member. With this construction the assembly of the two retainers 10a and 10b and balls 18 can be handled as a unit to facilitate shipping, transfer, further assembly, etc. With the embodiment of FIGURE 6 only one of the retainers 10a and 10b need be of a split ring construction. In the embodiment shown in FIGURE 6 the axially split ends are circumferentially offset to increase the rigidity of the assembly to displacing forces.

A still different embodiment is shown in FIGURE 7. There, two retainers 10a and 10c both of the split ring construction are utilized; there, retainer 10c is located at the same radial side of the balls 18 as the retainer 10a but is of a slightly larger diameter and is generally coextensive therewith. In that embodiment the split ends, i.e., at grooves 16 and 16c, are circumferentially offset thereby increasing the rigidity of the assembly to axial forces; because of the increased rigidity to axial displacing forces resulting from the offset of the split ends of retainers 10a and 10c, in some applications the tongue and groove constructions could be eliminated.

Note that the construction shown in the drawings are for use with ball bearings, by changing the shape of the pockets 12, other types of bearings, i.e., roller bearings, etc., could be accommodated.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a ball bearing construction the improvement comprising: an axially split resilient ring shaped retainer being heat treated while in its ring shape to increase resiliency, said retainer having confronting end portions movable circumferentially relatively to each other whereby the size of said retainer can be altered with said retainer resiliently returning to its original shape, said retainer having a plurality of circumferentially spaced apertures for receiving ball members said apertures being generally circularly shaped and of a diameter less than that of the ball members and defining radially tapering pockets substantially solely by the thickness of said retainer, said pockets extending radially for an extent substantially no greater than said thickness.

2. The apparatus of claim 1 further comprising a second retainer locatable proximate to and concentrically coextensively with said ring shaped retainer, said second retainer being axially split and ring shaped and having confronting second end portions movable circumferentially relatively to each other whereby the size of said second retainer can be altered with said second retainer resiliently returning to its original shape, said second retainer having a plurality of circumferentially spaced apertures for receiving the ball members.

3. The apparatus of claim 2 with said end portions circumferentially offset from said second end portions.

4. The apparatus of claim 2 further including means at said end portions and at said second end portions for locking said end portions from relative axial movement and said second end portions from relative axial movement.

5. The apparatus of claim 1 further comprising a second retainer locatable at the radially opposite end of the ball members relative to said ring shaped retainer and having a second plurality of circumferentially spaced apertures for receiving the antifriction members whereby with the ball members are radially held from movement in one direction by said ring shaped retainer and in an opposite direction by said second retainer.

6. The apparatus of claim 5 in which said second retainer being axially split and ring shaped and having confronting second end portions movable circumferentially relatively to each other whereby the size of said second retainer can be altered with said second retainer resiliently returning to its original shape.

7. The apparatus of claim 6 with said end portions circumferentially offset from said second end portions.

8. The apparatus of claim 6 further including means at said end portions and at said second end portions for locking said end portions from relative axial movement and said second end portions from relative axial movement.

9. The bearing retainer of claim 1 further including means at said end portions for locking said end portions from relative axial movement.

10. The retainer of claim 1 in which one of said end portions is formed with a tongue and the other is formed with a groove for receiving said tongue when said ring member is in said original shape.

11. The retainer of claim 10 with said ring member having a straight tubular contour.

12. The retainer of claim 11 with said apertures being equally circumferentially spaced.

13. The apparatus of claim 1 further including a race member having an annular raceway with said retainer member located coaxially with said raceway and resiliently radially retaining the ball members in said raceway.

14. The apparatus of claim 13 with said race member being an inner race member.

15. The apparatus of claim 13 with said race member being an outer race member.

16. The apparatus of claim 13 in which said pockets define portions of a sphere of a diameter generally equal to the diameter of the ball bearings.

17. The bearing retainer of claim 1 made by the steps of: forming a flat strip of material into a preformed flat blank having a plurality of spaced openings, forming the flat blank into a resilient ring member having a circular shape with the openings defining said apertures and heat treating the ring member to increase its resilience whereby the diametrical size of the ring member can be substantially, temporarily altered with it returning to its original shape.

18. The bearing retainer of claim 16 made by the steps of: forming the flat strip of material into the preformed flat blank to have the plurality of spaced openings with a tongue at one end and a groove at the other end, forming the flat blank into the ring member having a circular shape with the tongue located in the groove.

19. The bearing retainer of claim 16 further including the method of assembling it with a plurality of antifriction members to a race member having an annular raceway comprising the steps of: moving the ends of said retainer circumferentially relative to each other to alter the size of the ring to provide additional clearance with the raceway, locating the antifriction members in the said apertures between said retainer and the raceway, and releasing said retainer for return to its original shape whereby the antifriction members are retained by said retainer to the race member.

20. The bearing retainer of claim 16 made by the steps of: forming the flat strip of material into the preformed flat blank having the plurality of spaced openings with a tongue at one end and a groove at the other end, forming the flat blank into the ring member having the circular shape with the tongue located in the groove and assembling the retainer with a plurality of antifriction members to a race member having an annular raceway by moving the ends of said retainer circumferentially relative to each other to alter the size of the ring to provide additional clearance with the raceway, locating the antifriction members in the said apertures between said retainer and the raceway, and releasing said retainer for return to its original shape whereby the antifriction members are retained by said retainer to the race member.

References Cited

UNITED STATES PATENTS

| | | | |
|---|---|---|---|
| 644,608 | 3/1900 | Keller | 308—201 |
| 1,894,595 | 1/1933 | Mitchel | 29—148.4 |
| 2,105,013 | 1/1938 | Scribner | 308—217 |
| 2,729,520 | 1/1956 | Ritchie et al. | 308—217 |

FOREIGN PATENTS 212,147   1/1908   Germany.

MARTIN P. SCHWADRON, *Primary Examiner.*

FRANK SUSKO, *Examiner.*

UNITED STATES PATENT OFFICE
CERTIFICATE OF CORRECTION

Patent No. 3,368,854  
February 13, 1968

John S. Adams

It is hereby certified that error appears in the above numbered patent requiring correction and that the said Letters Patent should read as corrected below.

Column 4, lines 55, 61 and 73, for the claim reference numeral "16", each occurrence, read -- 17 --.

Signed and sealed this 15th day of April 1969.

(SEAL)  
Attest:

Edward M. Fletcher, Jr.  
Attesting Officer

EDWARD J. BRENNER  
Commissioner of Patents